US006813980B2

(12) United States Patent
Inayama (10) Patent No.: US 6,813,980 B2
(45) Date of Patent: Nov. 9, 2004

(54) CUTTING TOOL AND THROW-AWAY INSERT THEREFOR

(75) Inventor: Takashi Inayama, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 72 days.

(21) Appl. No.: 10/114,119

(22) Filed: Apr. 3, 2002

(65) Prior Publication Data

US 2002/0108475 A1 Aug. 15, 2002

Related U.S. Application Data

(63) Continuation-in-part of application No. 09/984,449, filed on Oct. 30, 2001.

(30) Foreign Application Priority Data

Nov. 30, 2000 (JP) ........................................ 2000-365619

(51) Int. Cl.[7] .............................. B23B 3/00; B23B 7/00; B23B 9/00; B23P 15/28; B26D 1/00
(52) U.S. Cl. .............................. 82/120; 82/129; 82/159; 407/102; 407/113
(58) Field of Search ......................... 407/66, 102, 103, 407/113, 119; 82/120, 121, 129, 159

(56) References Cited

U.S. PATENT DOCUMENTS

| | | | | |
|---|---|---|---|---|
| 3,156,032 A | * | 11/1964 | Lundgren | 407/114 |
| 3,308,693 A | * | 3/1967 | Bechler | 82/117 |
| 3,827,318 A | * | 8/1974 | Sorenson | 82/1.11 |
| 3,978,745 A | * | 9/1976 | Okamoto | 82/118 |
| 5,361,472 A | * | 11/1994 | Kubota | 29/37 A |
| 5,766,782 A | * | 6/1998 | Ljungberg | 428/698 |
| 5,779,400 A | * | 7/1998 | Fountaine | 407/103 |
| 6,090,476 A | * | 7/2000 | Thysell et al. | 428/216 |
| 6,207,262 B1 | * | 3/2001 | Ichikawa et al. | 428/216 |

FOREIGN PATENT DOCUMENTS

JP          11-156605          6/1999

OTHER PUBLICATIONS

Product brochure for NTK SS Cutting Tool and English translation, distributed at Machine Tool Fair in Tokyo, Japan from Oct. 28, 2000 to Nov. 4, 2000.

* cited by examiner

*Primary Examiner*—Daniel W. Howell
*Assistant Examiner*—Brian D. Walsh
(74) *Attorney, Agent, or Firm*—Sughrue Mion, PLLC

(57) ABSTRACT

A cutting tool is disposed on a turret. The cutting tool includes: a holder having a peak end, and a throw-away insert clamped to the peak end of the holder with a clamp screw. The holder has a bottom face and a peak end face defining a corner of the holder. The corner of the holder forms a chamfered face. The throw-away insert has a bottom face and a relief face defining a corner of the throw-away insert. The corner of the throw-away insert forms a chamfered face. The chamfered face of the corner of the holder and the chamfered face of the corner of the throw-away insert prevent the cutting tools adjacent to each other from causing an interference with each other when the cutting tools are at least one of in a standby position and in a machining operation.

32 Claims, 6 Drawing Sheets

CUTTING TOOL AND THROW-AWAY INSERT THEREFOR

This is a continuation-in-part of application No. 09/984,449, filed Oct. 30, 2001.

BACKGROUND OF THE INVENTION

1. Field of the Invention

The present invention relates to a cutting tool, and a throw-away insert for the cutting tool. The throw-away insert is clamped securely to substantially a peak end of a holder of the cutting tool with a clamp screw.

2. Description of the Related Art

In a category of automatic lathes such as a cam-type automatic lathe, an NC (numerical control) automatic lathe and the like, there is included a machining equipment which is provided with a plurality of turrets. The turrets of the machining equipment mount cutting tools. The cutting tools are disposed radially when viewed in a direction along a rotational axis of a chucked workpiece (cut material).

Figure 8:
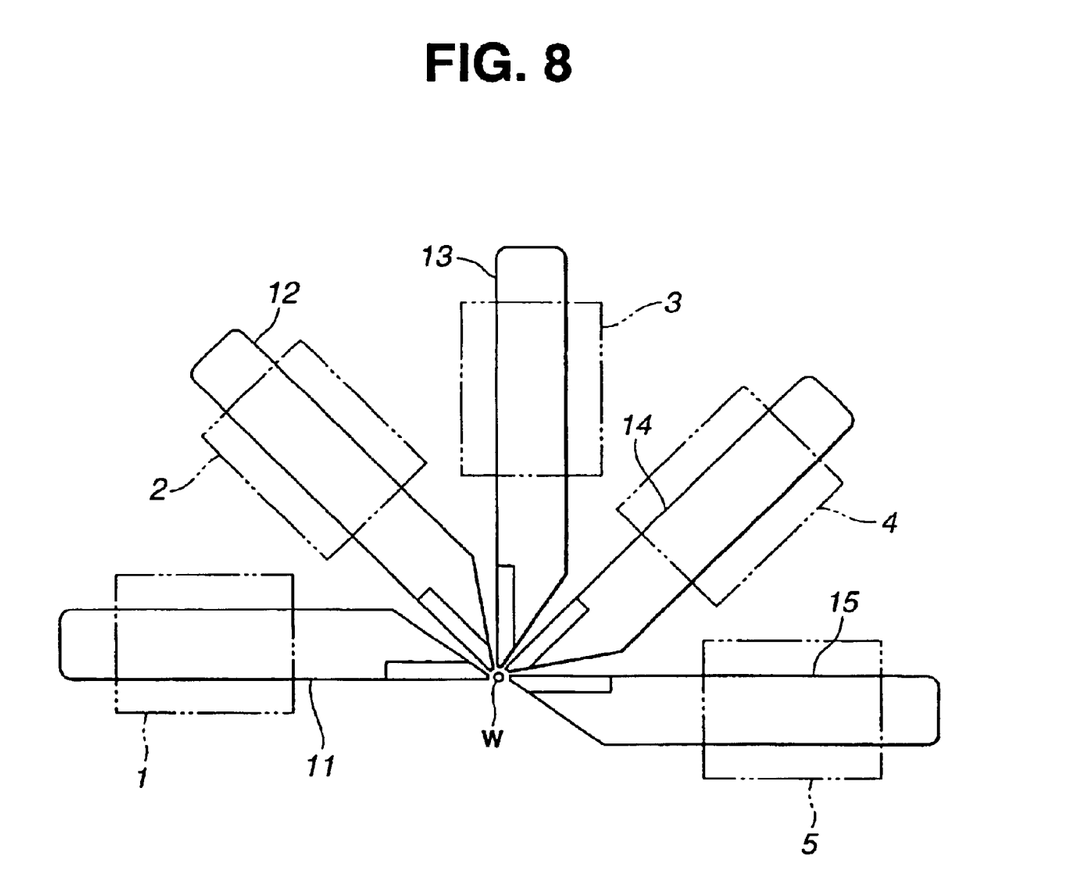
FIG. 8 shows a plurality of cutting tools 11 to 15 each of which is mounted on one of respective turrets 1 to 5 of the automatic lathe, viewed in the direction along the rotational axis of the workpiece W, according to a related art.

More specifically, as is seen in FIG. 8, the machining equipment is provided with five turrets 1 to 5 which are disposed around a rotational axis of a workpiece W. When viewed in the direction along the rotational axis of the workpiece W, the five turrets 1 to 5 are disposed radially. Each of the turrets 1 to 5 clamps one of respective cutting tools 11 to 15. Each of the cutting tools 11 to 15 has a cutting blade whose peak end is distant from the workpiece W in a standby condition, namely, when a machining operation is not under way. On the other hand, when the machining operation is under way, the cutting tool (singular or plural in number) having the cutting blade for the machining operation is (are) conveyed in a direction perpendicular to the rotational axis of the workpiece W and toward a center of the rotational axis of the workpiece W. The workpiece W is cut with the thus conveyed cutting tool(s) in a predetermined manner. The cutting tool(s) is (are) so controlled as to return to the original point after the machining operation. With this, the cutting tool {singular or plural in number (plural cutting tools are conveyed simultaneously)} is (are) conveyed one after another for the required machining operation.

Of the above automatic lathes, the one for machining a shaft part (small diameter) such as those used for watch, clock, camera, instrument (meter), computer and the like uses a cutting tool that is of a type whose holder is brazed with an insert (formed with the cutting blade).

Use of the cutting tool having the above "brazed insert" instead of a "throw-away insert" is probably attributable to causes described in the following three paragraphs:

The cutting tools mounted on the turrets of the above automatic lathe are disposed radially on a flat surface which is perpendicular to the rotational axis of the workpiece W. Thereby, as is seen in FIG. 8, the smaller the workpiece W is in external diameter, the closer the peak ends (of the cutting tools) are to each other, both in the standby condition and when the machining operation is under way.

In terms of the cutting tool having the throw-away insert: The workpiece W having the external diameter not more than 15.0 mm is ordinarily not usable. This is attributable to an interference of the cutting tools (collision with each other) each of which has the throw-away insert clamped with a clamp screw (The interference is caused even though the cutting tool has a comparatively compact peak end.).

In terms of the cutting tool having the brazed insert: Contrary to the cutting tool having the throw-away insert, the cutting tool having the brazed insert can be subjected to a grinding (at the peak end of the cutting tool, including the brazed insert) so as to prevent the interference (collision), without causing failures such as decrease in locking strength of the brazed insert. With this, the cutting tool having the brazed insert is usable.

The brazed insert is, however, high in cost, involving increase in machining cost. Moreover, the cutting tool having the brazed insert is formed through the grinding, which is responsible for decrease in precision (and/or accuracy) of centering (in other words, adjusting position of the cutting blade) during replacement of the cutting tool having the brazed insert. This involves further preparation steps.

In view of the above feature of the cutting tool having the brazed insert, use of the cutting tool having the throw-away insert is preferred even in such applications as machining the shaft parts (small diameter) by means of the automatic lathe.

BRIEF SUMMARY OF THE INVENTION

It is therefore an object of the present invention to provide a cutting tool having a throw-away insert, for machining a workpiece such as a shaft part defining a small external diameter.

More specifically, the cutting tool is plural in number each of which is mounted on one of a plurality of turrets disposed radially when viewed in a direction along a rotational axis of a chucked workpiece. The cutting tool (having the throw-away insert) is the one used for an automatic lathe such as a cam-type automatic lathe, an NC automatic lathe and the like.

According to a first aspect of the present invention, there is provided a cutting tool disposed on a turret. The cutting tool comprises: a holder having a peak end, and a throw-away insert clamped to the peak end of the holder with a clamp screw. The holder comprises: a bottom face and a peak end face defining a corner of the holder. The corner of the holder forms a chamfered face. The throw-away insert comprises: a bottom face and a relief face defining a corner of the throw-away insert. The corner of the throw-away insert forms a chamfered face.

According to a second aspect of the present invention, there is provided an automatic lathe for machining a round-rod workpiece (W) which is chucked on the automatic lathe and has an external diameter of not more than 5.0 mm before a machining operation. The automatic lathe comprises: a plurality of turrets (1, 2, 3, 4, 5) so disposed on the automatic lathe as to form a radiation when the plurality of the turrets (1, 2, 3, 4, 5) are viewed in a first direction along a rotational axis of the workpiece (W); and a plurality of cutting tools (101, 102, 103, 104, 105) disposed on the plurality of the turrets (1, 2, 3, 4, 5) in such a manner as to define a radial angular interval of 45° between two of the adjacent cutting tools (101, 102, 103, 104, 105). Each of the cutting tools (101, 102, 103, 104, 105) comprises: a holder (111) having a peak end; and a throw-away insert (51, 52, 53, 54, 55) clamped to the peak end of the holder (111) with a clamp screw (130). The holder (111) comprises a bottom face (114) and a peak end face (138) defining a corner of the holder (111). The corner of the holder (111) forms a chamfered face (132) so as to prevent the cutting tools (101, 102, 103, 104, 105) adjacent to each other from causing an interference with each other when the cutting tools (101, 102, 103, 104, 105) are at least one of in a standby position and in the machining operation. The throw-away insert (51, 52, 53, 54, 55) comprises a bottom face (154) and a relief face (158)

defining a corner of the throw-away insert (51, 52, 53, 54, 55). The corner of the throw-away insert (51, 52, 53, 54, 55) forms a chamfered face (152) so as to prevent the cutting tools (101, 102, 103, 104, 105) adjacent to each other from causing the interference with each other when the cutting tools (101, 102, 103, 104, 105) are at least one of in the standby position and in the machining operation.

Hereinafter described is TiCN coating as well as surface roughness of throw-away inserts.

According to the illustrated embodiment of the present invention, parent material (or base material) of the throw-away insert is extremely smooth having a surface roughness Ra (by JIS=Japanese Industrial Standard) not more than 0.3 µm.

Herein, Ra is technically referred to as "center-line mean roughness." The Ra is also referred to as "arithmetical mean roughness" which is one of surface roughnesses defined by JIS B 0601 (1994).

The surface of the parent material of the throw-away insert is coated with a thin TiCN layer not more than 2 µm in thickness. Thereby, the surface (TiCN coat) of a blade end of the throw-away insert is small in irregularity. The thus formed blade end of the throw-away insert grows without causing great distortion, and therefore, is welded stably. As a result, even a free cutting steel is cut accurately and/or precisely (dimensional tolerance: ±0.01 mm), to thereby machine workpieces in large number.

Herein, the TICN coating layer (not more than 2 µm) according to the illustrated embodiment of the present invention is thinner than conventional coating layer (for example, 3 µm to 5 µm). In spite of the thinness of the TiCN coating layer under the present invention, the cutting tool has a longevity. This longevity is attributable to the above stable welding of the blade end of the throw-away insert, and this stable welding is maintained preferably.

The parent material of the throw-away insert according to the illustrated embodiment of the present invention is made of various materials such as hard metal (or cemented carbide), ceramic, cermet (an acronym for ceramic metal—from Dictionary of Science and Technology issued by Academic Press), high speed steel and the like. The hard metal is, however, preferably the one whose raw material is made of ultra-fine-particle not more than 1 µm in grain size (Hereinafter such hard metal is referred to as "ultra-fine-particle hard metal."). As compared with an ordinary hard metal, the ultra-fine-particle hard metal under the present invention is high in toughness and hardness, thereby featuring good blade standing (in other words, good machinability forming an acute blade end of the throw-away insert). Moreover, the ultra-fine-particle hard metal is excellent in wear resistance as well as failure resistance.

The center-line mean roughness Ra (not more than 0.3 µm) according to the illustrated embodiment of the present invention is not a must for the entire surface of the parent material of the throw-away insert. In other words, "not more than 0.3 µm" should be applied to at least the blade end of the throw-away insert.

Moreover, according to the illustrated embodiment of the present invention, the TiCN coating layer may be single or multiple. To form the TiCN coating layer having thickness of not more than 2 µm, shorter (than conventional method) vapor deposition time is preferred.

The above sums up description of the TiCN coating as well as the surface roughness.

The other objects and features of the present invention will become understood from the following description with reference to the accompanying drawings.

DETAILED DESCRIPTION OF THE EMBODIMENT

Figure 1:
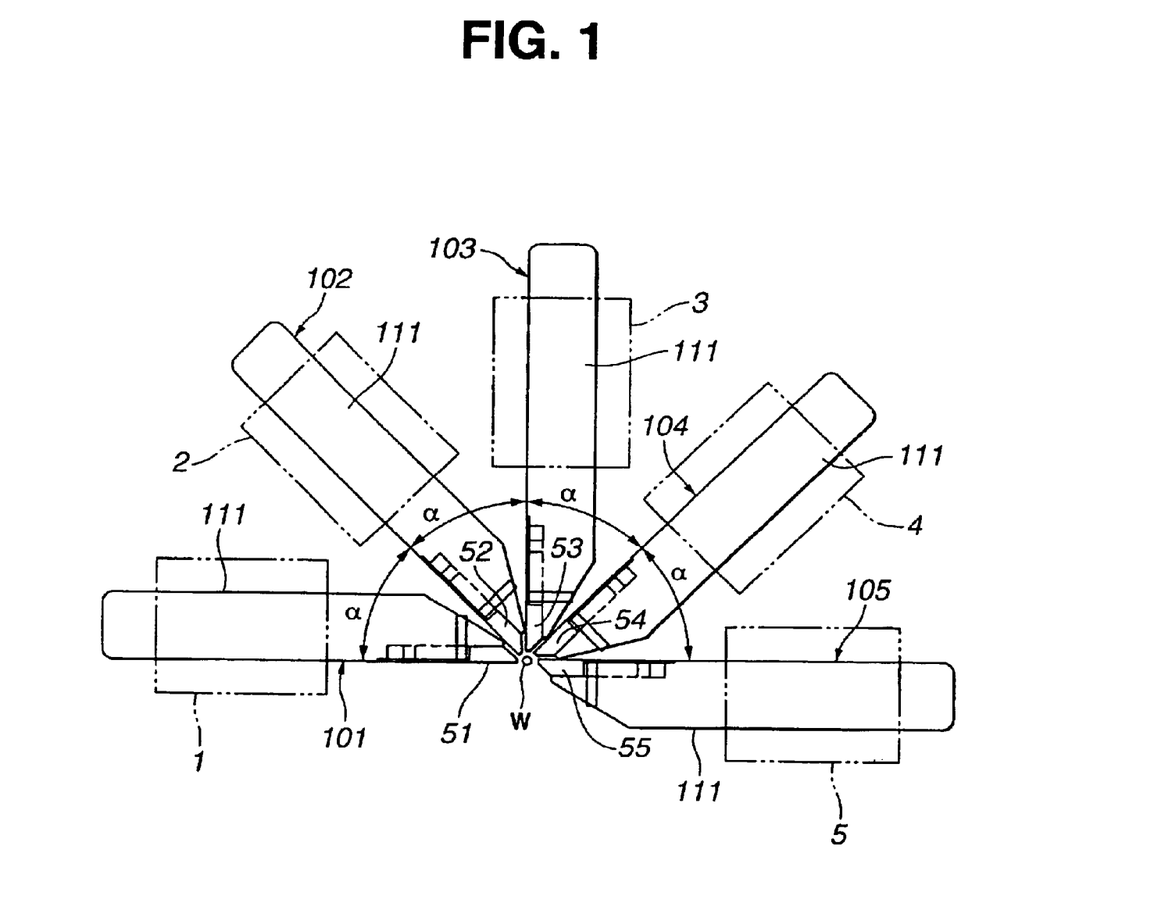
FIG. 1 shows a plurality of cutting tools 101 to 105 each of which is mounted on one of respective turrets 1 to 5 of an automatic lathe, viewed in a direction along a rotational axis of a workpiece W, according to an embodiment of the present invention.
Figure 2:
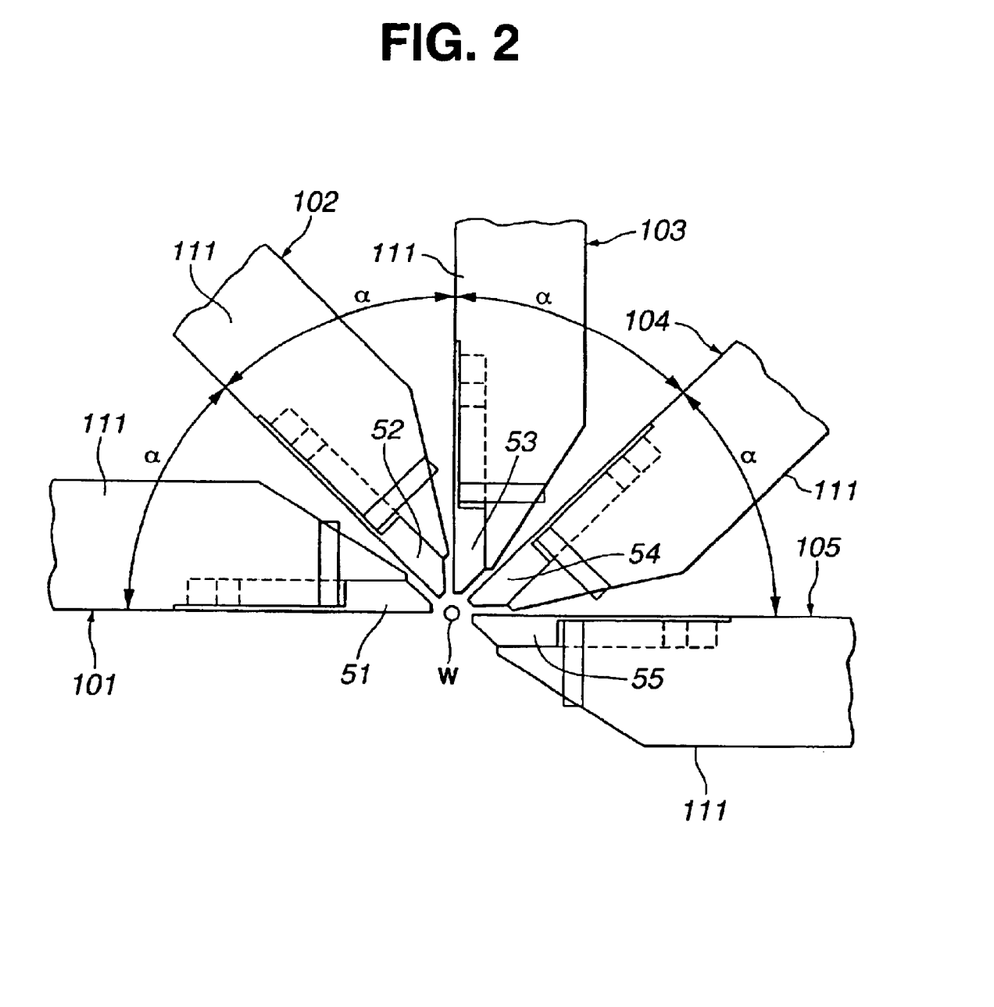
FIG. 2 is an enlarged view of a peak end of a holder 111 in FIG. 1.

As is seen in FIG. 1 to FIG. 7, there is provided a cutting tool, according to an embodiment of the present invention. FIGS. 1 to FIG. 4 show the cutting tool(s) viewed in a direction along a rotational axis of a workpiece W which is chucked in a condition that the cutting tool(s) is (are) mounted on a plurality of turrets of an automatic lathe. Each of FIG. 1 to FIG. 4 shows a standby condition before a machining (cutting) operation. Each numeral denoted by 1 to 5 is a turret. The turrets 1 to 5 are disposed radially at regular angular intervals of 45° (angular interval a), when viewed in the direction along the rotational axis of the workpiece W which is chucked on the automatic lathe (not shown). As is seen in FIG. 1, the turrets 1 to 5 are schematically denoted by two-dot chain lines. Each of the turrets 1 to 5 mounts one of the respective cutting tools 101 to 105, according to the embodiment. Thus the cutting tools 101 to 105 are also disposed radially at regular angular intervals of 45° (angular interval α), when viewed in the direction along the rotational axis of the workpiece W.

Figure 4:
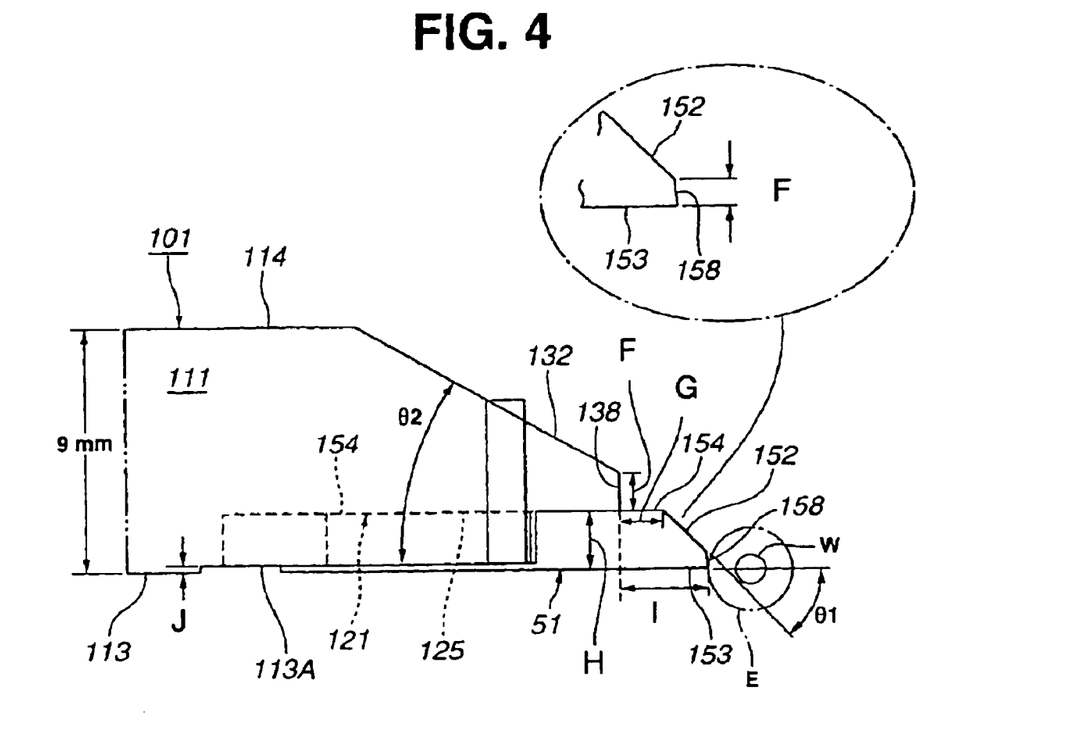
FIG. 4 shows a peak end of the cutting tool 101 viewed in the direction along the rotational axis of the workpiece W in FIG. 3.

According to the embodiment, each of the cutting tools 101 to 105 mounted on one of the respective turrets 1 to 5 has a holder 111 (same). Each of the adjacent cutting tools 101 to 105 clamps one of respective throw-away inserts 51 to 55 (each of which has a rake face 153 and a bottom face 154 opposite to the rake face 153, as is seen in FIG. 4). The cutting tools 101 to 105 are disposed radially, when viewed in the direction along the rotational axis of the workpiece W {hereinafter also referred to as "(in) front view"}. Moreover, the cutting tools 101 to 105 adjacent to each other are disposed in a condition that the rake face 153 (of one of the throw-away inserts 51 to 55) faces the bottom face 154 (of the adjacent another of the throw-away inserts 51 to 55).

Herein, the cutting tools 101 to 105 are basically common to each other in terms of configuration and constitution, except for configuration of a cutting blade of the throw-away inserts 51 to 55 clamped. Therefore, hereinafter described in detail is the cutting tool 101 only, as is seen in FIG. 4.

More specifically, the holder 111 constituting the cutting tool 101 is shaped substantially into a rod extending straightly, and has a cross section substantially shaped into a square defining four sides each of which is 9 mm (for example) long. The holder 111 defines a rod side face 113 which is positioned on a side defining the rake face 153 of the throw-away insert 51. The rod side face 113 defines a flat near-to-end face 113A which is parallel to the rod side face 113, and is slightly lower in level (about 0.5 mm upward in FIG. 4) than the rod side face 113. The near-to-end face 113A defines a chip pocket 121 dented.

Figure 5:
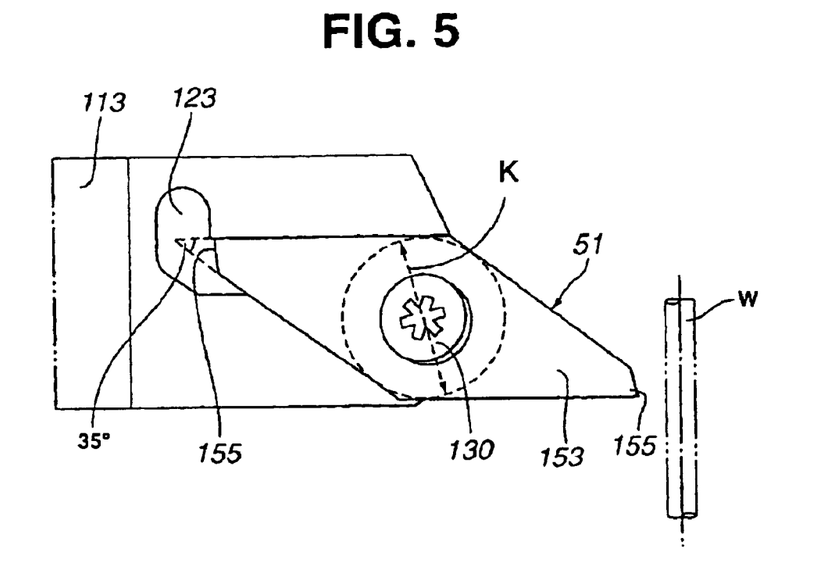
FIG. 5 shows the peak end of the cutting tool 101 viewed from a rake face 153 of the holder 111.

The throw-away insert 51 has a constant thickness in a range from 1 mm to 3.5 mm (about 2.5 mm according to the embodiment). As is seen in FIG. 5, the throw-away insert 51 is flat, and is shaped substantially into a rhombus defining an imaginary inscribing circle (6.35 mm in diameter) of the rake face 153. Moreover, the throw-away insert 51 has two noses 155 each of which defines an imaginary apex angle of 35° of the rhombus. One (left in FIG. 5) of the two noses 155 is receivable in the chip pocket 121. The chip pocket 121 has a bottom (left in FIG. 4) which is formed with a cutout 123 (FIG. 5) for relieving the one (left in FIG. 5) of the two noses 155.

Figure 6:
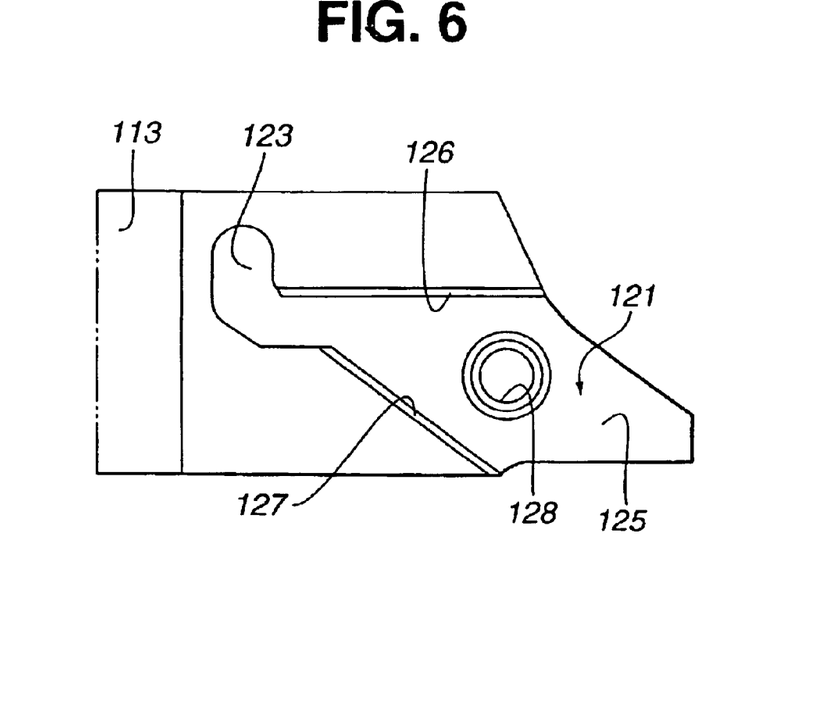
FIG. 6 shows a chip pocket 121 at the peak end of the cutting tool 101 viewed from a rod side face 113 of the holder 111.
Figure 7:
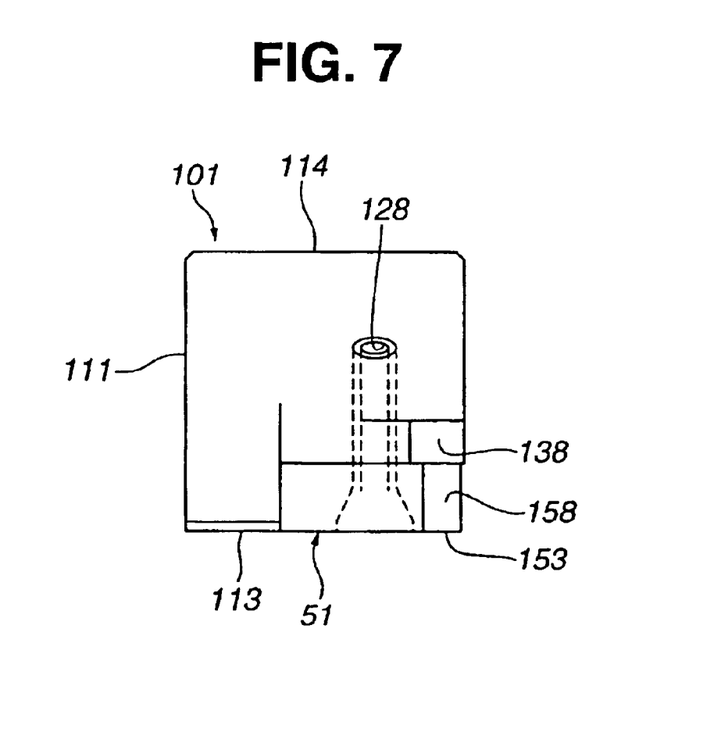
FIG. 7 shows the peak end of the cutting tool 101 viewed from a peak end face 138 of the holder 111.

As is seen in FIG. 6, the chip pocket 121 is constituted of a insert seated face 125 and a pair of a first wall face 126 and a second wall face 127. The insert seated face 125 is flat, and the first wall face 126 and the second wall face 127 restrict the throw-away insert 51. As is seen in FIG. 5, FIG. 6 and FIG. 7, the insert seated face 125 defines a screw hole 128 (through hole) for a clamp screw 130.

As is seen in FIG. 4, the holder 111 has a bottom face 114 and a chamfered face 132 (to be described in detail afterwards) adjacent to the bottom face 114. The screw hole 128 extends to the chamfered face 132, and opens in substantially a center area of the chamfered face 132 in a longitudinal direction of the holder 111.

Thereby, the throw-away insert 51 (flat, rhombus, and defining a hole) is seated on the insert seated face 125 of the chip pocket 121, with the bottom face 154 abutting on the insert seated face 125 while two peripheral faces (restricted faces) abutting respectively on the first wall face 126 and the second wall face 127. The clamp screw 130 is a countersunk head screw {for example, M2.5 by JIS (=Japanese Industrial Standard), and 5 mm in length, according to the embodiment}, and is screwed into the screw hole 128 for fixation which is defined substantially in the center of the rake face 153.

Herein, the clamp screw 130 has a shank and a countersunk head which is depressed (upward as viewed in FIG. 4) below the rake face 153 in level. Moreover, the rake face 153 of the throw-away insert 51 in this embodiment is depressed (upward as viewed in FIG. 4) below the rod side face 113 of the holder 111 in level. Preferably, the rake face 153 is sunk below the rod side face 113 to a depth in the range from 0.05 mm to 0.3 mm. In this example, the rake face 153 is sunk below the rod side face 113 by 0.1 mm. Thus, in this example, the perpendicular distance between the substantially flat rake face 153 of the throw-away insert 51 and the substantially flat rod side face 113 substantially parallel to the rake face 153 in the assembled state is in the range of 0.05 mm~0.3 mm. With the above configuration, the cutting tool 101 is smoothly mounted (inserted) on and removed (pulled) from the turret 1.

As is seen in FIG. 4 and FIG. 5, the thus clamped throw-away insert 51 has a peak end {including the nose 155 (cutting blade)} extending from the insert seated face 125, and forms a protrusion from a peak end face 138 (of the holder 111), which protrusion is about 1 to 1.5 times thickness of the throw-away insert 51. According to the embodiment, the protrusion is, for example, about 2 mm.

Moreover, there is formed a chamfered face 152 at a corner which is defined between a relief face 158 and the bottom face 154 of the throw-away insert 51. As is seen in FIG. 4 (in the front view), the chamfered face 152 is substantially a plane (flat face) which is cut straight, leaving 0.3 mm to 1.5 mm (in a direction of thickness from the rake face 153, namely, in a direction perpendicular to the rake face 153) for the relief face 158. According to the embodiment, about 0.5 mm is left for the relief face 158. The chamfered face 152 is designed to form a first chamfer angle θ1 of 45° relative to the rake face 153 in the front view. The angle θ1 is, however, allowed to be in a range from 35° to 45°.

Moreover, according to the embodiment, the bottom face 154 (of the throw-away insert 51) extending from the insert seated face 125 defines a small protrusion (about 0.5 mm) from the peak end face 138 of the holder 111.

The throw-away insert 51 according to the embodiment has the two noses 155 each of which is the cutting blade defining the imaginary apex angle of 35°. The cutting blades of the two noses 155 form a point symmetry in plan view, as is seen in FIG. 5.

Moreover, the throw-away insert 51 is coated with TiCN on a surface thereof in the following sequential steps (The surface of the throw-away insert 51, however, excludes a wall of the screw hole 128.):

1. Prepare the parent material of the throw-away insert 51, which parent material is an ultra-fine-particle hard metal.
2. Polish the relief face 158 and the rake face 153 including the blend end of the cutting blade, so as to finish the relief face 158 and the rake face 153 with the center-line mean roughness Ra not more than 0.3 μm. Herein, ridge of the blend end of the cutting blade is extremely acute.
3. Coat the surface of the throw-away insert 51 with TiCN having a layer of thickness not more than 2 μm (set value 1.5 μm).

According to the illustrated embodiment of the present invention, the parent material of the throw-away insert 51 has the center-line mean roughness Ra not more than 0.3 μm, which roughness is substantially equivalent to that of mirror finished surface. Moreover, under the present invention, the TiCN coating is as thin as not more than 2 μm. In other words, the coating layer formed in the vicinity of the blend end (ridge of cutting blade) of the throw-away insert 51 is extremely smooth. The extreme smoothness and the thinness of the coating layer contribute to reduction in surface roughness during formation of the coating layer.

The above is summarized as follows: The blade end of the throw-away insert 51 is formed small (thin) and stable. Therefore, cutting the free cutting steel with the thus formed blade end of the throw-away insert 51 does not decrease precision and/or accuracy of machining the workpiece W requiring dimensional tolerance of ±0.01 mm. The surface roughness of the parent material of the throw-away insert 51 after forming the TiCN coating layer is checked by removing the TiCN coating layer with solvent.

Moreover, the holder 111 has a peak end formed with the chamfered face 132. As is seen in FIG. 4, the chamfered face 132 is continuous with the bottom face 114, and is discontinuous with the insert seated face 125 leaving an allowance (about 0.5 mm according to the embodiment, allowance between the chamfered face 132 and the insert seated face 125) for the peak end face 138. The chamfered face 132 is substantially a plane (flat face) which is cut straight in the front view.

According to the embodiment, there is formed a second chamfer angle $\theta 2$ which is designed 30°, as is seen in FIG. 4. In other words, in the front view, the chamfered face 132 and the near-to-end face 113A (of the holder 111) forms 30°. Moreover, the chamfered face 132 and the rake face 153 (of the throw-away insert 51) forms 30°. The second chamfer angle $\theta 2$ is preferably in a range from 30° to 45°. In addition, the second chamfer angle $\theta 2$ is preferably smaller than the first chamfer angle $\theta 1$. A peak end (opposite to the screw head) of the clamp screw 130 can protrude to some extent when the screw hole 128 is open on the chamfered face 132 at the peak end of the holder 111. Therefore, with the second chamfer angle $\theta 2$ smaller than the first chamfer angle $\theta 1$, thread area can be effectively secured.

According to the embodiment, substantially a peak end of the cutting tool 101 in overall view forms a great chamfer. More specifically, as is seen in FIG. 4 (in the front view), the relief face 158 (at the peak end of the throw-away insert 51) and the bottom face 114 (of the holder 111) form the great chamfer striding therebetween.

Figure 3:
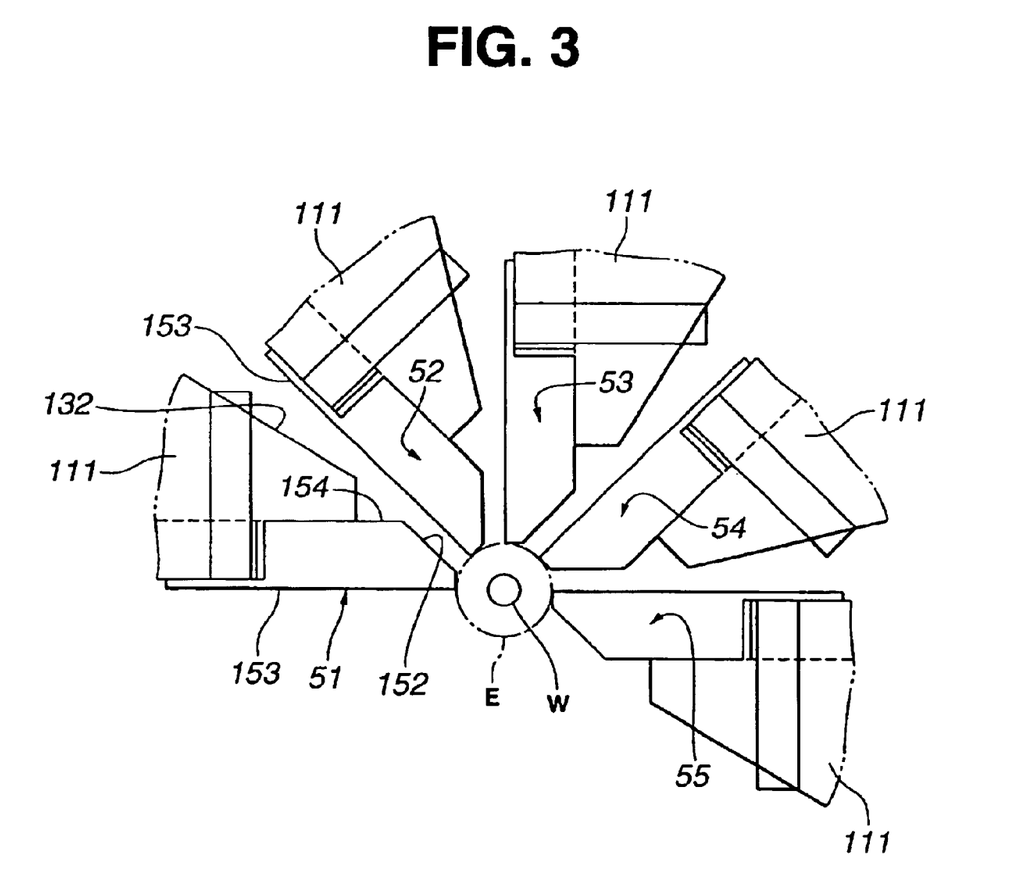
FIG. 3 is an enlarged view showing an area in the vicinity of the workpiece W in FIG. 2 in a standby condition.

Each of the cutting tools 101 to 105 thus constituted is used, for example, for machining the workpiece W of substantially a round rod whose material has an external diameter of 1 mm. As is seen in FIG. 1 to FIG. 4, each of the cutting tools 101 to 105 is mounted on one of the respective turrets 1 to 5 disposed radially. As is seen in FIG. 3 (the front view), in the standby condition (or position) before machining, the peak end of the nose 155 (cutting blade) of each of the cutting tools 101 to 105 is disposed on an imaginary circumference E having a radius of 2 mm around the rotational axis of the workpiece W.

Each of the throw-away inserts 51 to 55 of one of the respective cutting tools 101 to 105 is formed with the chamfered face 152, while each of the holders 111 of one of the respective cutting tools 101 to 105 is formed with the chamfered face 132. Thereby, the cutting tools 101 to 105 are free from any interference or collision with each other. The freedom from the interference or collision is secured even in the following situations: i) Standby condition (or position), as is seen in FIG. 3. ii) When any one of the cutting tools 101 to 105 is conveyed in a direction perpendicular to the rotational axis of the workpiece W and toward a center of the rotational axis of the workpiece W, to thereby start machining the workpiece W. iii) When a plurality of the cutting tools 101 to 105 are simultaneously conveyed in the direction perpendicular to the rotational axis of the workpiece W and toward a center of the rotational axis of the workpiece W, to thereby start machining the workpiece W (in this case, however, simultaneously conveyed are the cutting tools that are not adjacent to each other).

Therefore, the cutting tools 101 to 105 according to the embodiment are mounted on the turrets which are disposed on a cam-type automatic lathe or an NC automatic lathe. The turrets are so disposed as to form a radiation when viewed in the direction along the rotational axis of the workpiece W. The thus mounted cutting tools 101 to 105 effectively carry out machining operation of the small shaft parts, without causing any interference between the adjacent cutting tools 101 to 105. Included in the small shaft parts is the one having the external diameter of 1 mm.

Described in the above embodiment is the five cutting tools mounted, at regular angular intervals of 45° in the front view, on a plurality of the turrets which are disposed on the automatic lathe. Herein, the five cutting tools are subjected to the machining operation for machining the workpiece having an external diameter of 1 mm.

The cutting tool according to the illustrated embodiment of present invention has the following minimum requirement:

The chamfer at the corner of the throw-away insert (of the cutting tool) and the chamfer at the corner of the holder (of the cutting tool) should have appropriate angle and area, so that the adjacent cutting tools can prevent any interference in accordance with the radial angular intervals between the cutting tools and with the external diameter of the workpiece.

The above minimum requirement should be satisfied both when the cutting tools disposed on the turrets are in the standby condition and when the machining operation is under way.

The turrets of the above automatic lathe are disposed in such a manner that the cutting tools mounted on the turrets ordinarily have radial angular intervals of 45° each other. In this case, of the conventional cutting tools, the one having the throw-away insert clamped with the clamp screw is likely to cause interference even if such cutting tool is small, in the case that the workpiece before the machining operation is not more than 15 mm in external diameter.

In other words, the above paragraph is summarized as follows:

Conditions:
i) The turrets are preferably disposed in such a manner that the cutting tools mounted on the turrets have radial angular intervals of 45°.
ii) The workpiece before the machining operation is not more than 15 mm in external diameter.
iii) The cutting tools are mounted on the turrets in the standby condition before machining operation or in the machining operation.

In the above three conditions i) to iii), each of the cutting tools preferably has a chamfered face at a corner of the throw-away insert and a chamfered face at a corner of the holder, so as to prevent any interference (or collision) which may be caused between the adjacent cutting tools. Such cutting tools are generally usable and especially preferable.

The interference between the adjacent cutting tools is prevented (or is less likely to occur) with the following two measures taken together:
i) Decrease the first chamfer angle $\theta 1$ (of the chamfered face 152) and the second chamfer angle $\theta 2$ (of the chamfered face 132).
ii) Enlarge width (cutting area) of the chamfered face 132 and the chamfered face 152 in the front view.

The two measures described above, however, are likely to decrease strength of the cutting tool. Therefore, the above decrease (of the first chamfer angle $\theta 1$ and the second chamfer angle $\theta 2$) and enlargement (of the width of the chamfered face 132 and the chamfered face 152) should preferably be restricted to such an extent that the cutting tool is not decreased in strength.

Moreover, each of the throw-away inserts mounted on the holder should define a cutting blade which has proper configuration in accordance with required machining operation (such as grooving, turning external diameter, and machining back side of flange).

The throw-away insert in plan view is not limited to the rhombus as the one seen in FIG. 5. Such rhombus (in other words, an "elongated" throw-away insert when viewed on rake face) according to the embodiment is, however, preferable for the following reason:

To allow the chamfer of the holder to secure as many threads of the screw hole (for the clamp screw for fixing the throw-away insert) as possible, the screw hole is preferably disposed as backward (in other words, toward bottom end of the holder, or leftward in FIG. 5) as possible from the peak end face of the holder.

As is seen in FIG. 7, the rod side face 113 and the bottom face 114 of the holder 111 according to the illustrated embodiment extend in parallel to each other between two opposite outside faces, and the center of the screw (through) hole 128 is situated to one of the two opposite outside face (to the lower face as viewed in FIG. 6, and to the right face as viewed in FIG. 7). The peak end face 138 of the holder 111 is formed only in a region between the position of the center of the screw hole 128 and the right outside face of the holder as viewed in FIG. 7. As is seen in FIG. 6, the flat near-to-end face 113A of the holder extends continuously around the chip pocket 121 from a first end located on one side of the through hole 128 (on the upper side as viewed in FIG. 6) to a second end located on the other side of the through hole (on the lower side as viewed in FIG. 6), so that the cutout 123 is shaped like an impasse.

Although the present invention has been described above by reference to one embodiment, the present invention is not limited to the one embodiment described above. Modifications and variations of the embodiment described above will occur to those skilled in the art, in light of the above teachings.

The entire contents of basic Japanese Patent Application No. P2000-365619 (filed Nov. 30, 2000) of which priority is claimed is incorporated herein by reference.

The scope of the present invention is defined with reference to the following claims.

What is claimed is:

1. A cutting tool disposed on a turret, the cutting tool comprising:
   a holder having a peak end, and comprising:
      a bottom face and a peak end face defining a corner of the holder, the corner of the holder forming a chamfered face defined by the bottom face and peak end face of the holder; and
   a throw-away insert clamped to the peak end of the holder with a clamp screw, the throw-away insert comprising:
   a bottom face and a relief face defining a corner of the throw-away insert, the corner of the throw-away insert forming a chamfered face;
   the holder further includes a rod side face opposite to the bottom face of the holder;
   the throw-away insert further comprises a rake face opposite to the bottom face of the throw-away insert, the rake face being sunk from the rod side face of the holder; and
   the chamfered face of the throw-away insert and the rake face in combination form a first chamfer angle which is in a range from 35° to 45°.

2. The cutting tool as claimed in claim 1, in which
   the cutting tool is plural in number, and the turret is plural in number; and
   each of the plurality of the cutting tools is disposed on corresponding one of the plurality of the turrets which are disposed radially on an automatic lathe, the radial disposition of the turrets being viewed in a first direction along a rotational axis of a workpiece which is chucked on the automatic lathe.

3. The cutting tool as claimed in claim 2, in which the cutting tools adjacent to each other are free from an interference with each other when the cutting tools are at least one of in a standby position and in a machining operation.

4. The cutting tool as claimed in claim 1, in which
   the chamfered face at the corner of the holder is substantially flat; and
   the chamfered face at the corner of the throw-away insert is substantially flat.

5. The cutting tool as claimed in claim 1, in which the rake face is sunk from the rod side face of the holder in a range from 0.05 mm to 0.3 mm.

6. The cutting tool as claimed in claim 1, in which the holder further comprises a near-to-end face opposite to the bottom face of the holder; and
   the chamfered face of the holder and the near-to-end face in combination form a second chamfer angle which is in a range from 30° to 45°.

7. The cutting tool as claimed in claim 6, in which the second chamfer angle is smaller than the first chamfer angle.

8. The cutting tool as claimed in claim 7, in which
   the throw-away insert is shaped substantially into a rhombus when the throw-away insert is viewed in a second direction perpendicular to the first direction along the rotational axis of the workpiece; and
   the throw-away insert has two noses each of which defines an imaginary apex angle of 35° when the throw-away insert is viewed in the second direction.

9. The cutting tool as claimed in claim 8, in which the clamp screw is received in a screw hole extending to the chamfered face and opening in substantially a center area of the chamfered face in a longitudinal direction of the holder.

10. The cutting tool as claimed in claim 1, in which
    the throw-away insert is made of a parent material whose cutting blade defines a blade end having a surface roughness not more than 0.3 $\mu$m; and
    at least the blade end of the cutting blade of the parent material of the throw-away insert is coated with a TiCN coating layer not more than 2 $\mu$m in thickness.

11. The cutting tool as claimed in claim 10, in which the parent material of the throw-away insert is an ultra-fine-particle hard metal.

12. The cutting tool as claimed in claim 11, in which the ultra-fine-particle hard metal is not more than 1 $\mu$m in grain size.

13. An automatic lathe for machining a round-rod workpiece which is chucked on the automatic lathe and has an external diameter of not more than 5.0 mm before a machining operation, the automatic lathe comprising:
    (a) a plurality of turrets so disposed on the automatic lathe as to form a radiation when the plurality of the turrets are viewed in a first direction along a rotational axis of the workpiece; and
    (b) a plurality of cutting tools disposed on the plurality of the turrets in such a manner as to define a radial angular interval of 45° between two of the adjacent cutting tools, each of the cutting tools including:
       (b)(i) a holder having a peak end, the holder having a bottom face and a peak end face defining a corner of the holder, the corner of the holder forming a chamfered face defined by the bottom face and peak end face of the holder so as to prevent the cutting tools adjacent to each other from causing an interference with each other when the cutting tools are at least one of in a standby position and in the machining operation; and (b)(ii) a throw-away insert clamped to the peak end of the holder with a clamp screw, the throw-away insert having a bottom face and a relief face defining a corner of the throw-away insert, the corner of the throw-away insert forming a chamfered face so as to prevent the cutting tools adjacent to each other from causing the interference with each other when the cutting tools are at least the one of in the standby position and in the machining operations the holder further includes a rod side face opposite to the bottom face of the holder;

the throw-away insert further comprises a rake face opposite to the bottom face of the throw-away insert, the rake face being sunk from the rod side face of the holder; and the chamfered face of the throw-away insert and the rake face in combination form a first chamfer angle which is in a range from 35° to 45°.

14. The automatic lathe as claimed in claim 13, in which the chamfered face at the corner of the holder is substantially flat; and the chamfered face at the corner of the throw-away insert is substantially flat.

15. The automatic lathe as claimed in claim 13, in which the rake face is sunk below the rod side face of the holder in a range from 0.05 mm to 0.3 mm.

16. The automatic lathe as claimed in claim 13, in which the holder further comprises a near-to-end face opposite to the bottom face of the holder; and the chamfered face of the holder and the near-to-end face in combination form a second chamfer angle which is in a range from 30° to 45°.

17. The automatic lathe as claimed in claim 16, in which the second chamfer angle is smaller than the first chamfer angle.

18. The automatic lathe as claimed in claim 13, in which the throw-away insert is made of a parent material whose cutting blade defines a blade end having an arithmetical mean roughness not more than 0.3 $\mu$m; and at least the blade end of the cutting blade of the parent material of the throw-away insert is coated with a TiCN coating layer not more than 2 $\mu$m in thickness.

19. The automatic lathe as claimed in claim 18, in which the parent material of the throw-away insert is an ultra-fine-particle hard metal not more than 1 $\mu$m in grain size.

20. A cutting tool adapted to be arranged radially around a workpiece with other tools for cutting, the cutting tool comprising:

a holder which extends in a longitudinal direction to a peak end terminating at a peak end face and which includes a bottom face and a rod side face opposite to the bottom face, the bottom face and rod side face both extending in the longitudinal direction of the holder, the peak end of the holder including a chamfered face formed between the peak end face of the holder and the bottom face of the holder; and a throw-away insert fastened to the peak end of the holder with a clamp screw, the throw-away insert extending in the longitudinal direction of the holder and terminating at a relief face, the throw-away insert including a bottom face and a rake face opposite to the bottom face of the throw-away insert, the bottom face and the rake face of the throw-away insert extending in the longitudinal direction of the holder, the throw-away insert further including a chamfered face formed between the relief face and the bottom face of the throw-away insert, the rake face of the throw-away insert being sunk below the rod side face of the holder toward the bottom face of the holder.

21. The cutting tool as claimed in claim 20, in which the rake face of the throw-away insert is sunk below the rod side face of the holder toward the bottom face of the holder, to a depth in the range from 0.05 mm to 0.3 mm.

22. The cutting tool as claimed in claim 21, in which the rake face of the throw-away insert and the rod side face of the holder are substantially flat and parallel to each other.

23. The cutting tool as claimed in claim 20, wherein the clamp screw includes a countersunk head which is depressed below the rake face of the throw-away insert.

24. The cutting tool as claimed in claim 20, wherein the holder is formed with a chip pocket receiving the throw-away insert, and including a depressed face abutting on the bottom face of the throw-away insert, and the chip pocket is depressed to such a depth that the rake face of the throw-away insert is sunk below the rod side face of the holder.

25. The cutting tool as claimed in claim 24, wherein the depressed face of the chip pocket is substantially flat and extends to an end in the longitudinal direction of the holder, and the peak end face of the holder extends upright from the end of the flat depressed face of the chip pocket.

26. The cutting tool as claimed in claim 25, wherein the holder comprises a flat near-to-end face opposite to the bottom face of the holder, and the flat depressed face of the chip pocket is depressed below the flat near-to-end face, and the flat near-to-end face extends continuously around the chip pocket from a first end on one side of a through hole, to a second end located on the other side of the through hole.

27. The cutting tool as claimed in claim 20, in which the holder is farmed with a through hole opening in the chamfered face of the holder, and the throw-away insert is fastened to the holder with the clamp screw inserted in the through hole.

28. The cutting tool as claimed in claim 27, wherein the clamp screw includes an end projecting from the chamfered face of the holder, out of the through hole of the holder.

29. The cutting tool as claimed in claim 27, wherein the through hole is opened in a center area of the chamfered face of the holder.

30. The cutting tool as claimed in claim 27, wherein the holder comprises opposing first and second outside faces between which the bottom face of the holder extends, a center of the through hole is situated to the first outside face, away from a middle between the first and second outside faces of the holder, and the peak end face of the holder extends only in a region between the center of the through hole and the first outside face of the holder.

31. The cutting tool as claimed in claim 20, wherein the relief face of the throw-away insert is in a range of 0.3 mm~1.5 mm in height as measured in a direction perpendicular to the longitudinal direction of the holder.

32. The cutting tool as claimed in claim 20, wherein the peak end face of the holder is about 0.5 mm in height, and the bottom face of the throw-away insert projects about 0.5 mm from the peak end face of the holder.

* * * * *